UNITED STATES PATENT OFFICE.

BRUNO TÜRKE, OF MUNICH, GERMANY.

PREPARATION FOR REGENERATING METALS.

1,029,327.  Specification of Letters Patent.  Patented June 11, 1912.

No Drawing.  Application filed February 9, 1911. Serial No. 607,554.

*To all whom it may concern:*

Be it known that I, BRUNO TÜRKE, a subject of the King of Saxony, and residing at Munich, Bavaria, German Empire, have invented certain new and useful Improvements in Preparations for Regenerating Metals, of which the following is a specification.

The present invention relates to a preparation for restoring the original character and quality to metals which through overheating or burning can no longer be properly worked, owing to their having lost their carbon, etc.

The new regenerating agent consists of a mixture of the following ingredients, combined in substantially the proportions stated, viz.: 5 parts of a resin allied to the terpenes, 2 parts of bone dust—$Ca_3(PO_4)_2$, 1 part of blue vitriol—$CuSO_4+5H_2O$, 1 part of borax—$Na_2B_4O_7+10H_2O$, 1 part of rock salt—NaCl.

As is well known, so-called hardening-agents have been employed to impart a superficial hardness to certain metals, as it is not possible to harden them normally. My invention differs essentially from such method, as by means of my new preparation the carbon which has been lost through overheating and the like, can be readily restored to the interior of the metal, so that the latter can be subsequently hardened again in the customary manner.

In carrying out my invention, a pulverulent preparation is made from the already mentioned substances. This preparation is distributed over the deteriorated metal—for instance, iron or steel—in red-hot state. The vapors which are given off during combustion of the preparation penetrate the open pores of the metal, so that the latter becomes again thoroughly impregnated with the lost carbon. In this manner the metal regains its original quality and is rendered fit for being worked up again.

Having thus described my invention, I declare that what I claim as new, and desire to secure by Letters Patent of the United States, is—

1. The composition of matter, consisting of resin, bone dust, blue vitriol, borax, and rock salt, the amount of bone dust being double that of each of the other ingredients, except the resin, the quantity of which latter is equal to the sum of the quantities of all the other ingredients together, substantially as herein described.

2. The herein-described agent for regenerating metals, consisting of a pulverulent preparation of five parts of a resin allied to the terpenes, two parts of bone dust, one part of blue vitriol, one part of borax, one part of rock salt, substantially as specified.

In testimony whereof I affix my signature in presence of two witnesses.

BRUNO TÜRKE.

Witnesses:
 ARTHUR V. W. COTTER,
 MATHILDE K. HELD.